United States Patent [19]
Gardner et al.

[11] 3,777,712
[45] Dec. 11, 1973

[54] ELECTRIC ANIMAL TRAINER

[75] Inventors: Hugh R. Gardner; Calvin I. Ricketts, both of Las Cruces, N. Mex.; Wesley L. Joosten, El Paso, Tex.

[73] Assignee: Jetco Electronic Industries, Inc., El Paso, Tex.

[22] Filed: Feb. 1, 1972

[21] Appl. No.: 222,499

[52] U.S. Cl. ................................. 119/29, 231/2 E
[51] Int. Cl. ........................................... A01k 15/00
[58] Field of Search ................... 119/29, 96, 106; 231/2 E; 325/118, 119, 361, 364

[56] References Cited
UNITED STATES PATENTS
| | | | |
|---|---|---|---|
| 3,589,337 | 6/1971 | Doss | 119/29 |
| 3,310,754 | 3/1967 | Stewart | 325/118 X |
| 3,372,338 | 3/1968 | Kubota et al. | 325/364 |

*Primary Examiner*—Louis G. Mancene
*Assistant Examiner*—J. N. Eskovitz
*Attorney*—Paul E. Harris et al.

[57] ABSTRACT

A radio frequency signal modulated at a predetermined audio frequency is transmitted to a receiver carried by the animal to be trained. The modulated signal is detected, amplified and demodulated, and the resulting audio signal is then amplified by a tuned audio amplifier. A trigger circuit is arranged to accept audio signals resulting from an original modulation percentage greater than a predetermined level and to create a voltage pulse at electrodes arranged to bear against the animal's fur. Means are provided for attenuating audio signals which differ from the predetermined audio frequency.

6 Claims, 2 Drawing Figures

PATENTED DEC 11 1973 3,777,712

ELECTRIC ANIMAL TRAINER

BACKGROUND OF THE INVENTION

1. Field of the Invention

Radio signal actuated animal training apparatus.

2. Description of the Prior Art

In the training of animals, particularly dogs, it is frequently necessary to issue commands when the dog is physically separated from the trainer. However, when the commands are not obeyed, the physical separation involved usually delays correction of the dog by the trainer, thereby reducing the effectiveness of the correction and extending the required training period. Accordingly, various electronic devices have been proposed to allow the trainer to punish the dog immediately for disobedience.

Most present training devices arranged for remote actuation employ a small, hand held transmitter in combination with a receiver carried by the dog on a collar. Shock electrodes carried by the collar and actuated by the receiver are arranged to provide a harmless but detectable shock to the dog. Using a device of this type the trainer can administer punishment immediately upon disobedience by the dog and training time can be significantly reduced.

Various transmitter and receiver circuits have been proposed for use in animal training systems. Typical are those shown in the U.S. Pat. Nos. to Cameron, 2,800,104, and to Doss, 3,589,337. One feature common to both foregoing circuits, and used as well by the balance of known prior art, is a vibrator or relay arranged for actuation upon receipt of the desired signal from the trainer's transmitter. The relay is connected to the primary of a transformer and generates a pulsating d.c. which is then stepped-up by the transformer to the required shocking potential. However, several problems are encountered when using such a vibrator or relay. First, being a mechanical device, the relay is subject to the severe vibrations resulting from the dog's movements, and can fail in service. Secondly, the physical size and weight of a relay can add significantly to the weight of the dog collar device, thereby limiting its usefulness to larger dogs.

Another problem of prior art devices is the type of signal generation and detection employed. One type of device operates on the principle of the presence or absence of an r.f. carrier frequency, with a shock potential generated whenever the receiver detects a carrier on the predetermined r.f. frequency. However, the range of usable frequencies for this service is strictly limited by the F.C.C. Currently such service is permitted in the 27 MHz, or class "C" band, which is also used concurrently by other services. Accordingly, a signal generated by one of these other services could activate this type of system and could result in the unintended generation of a shocking potential. Similar spurious actuation could also arise from spurious radiations, adjacent channel interference, or atmospheric conditions.

A second type of prior art device overcomes some of the foregoing signal selection problems. This type of device utilizes a time delay feature which inhibits generation of the shock potential until a signal has been received for a predetermined time period, usually a second or two. However, such a device is still susceptible to accidental actuations, since spurious and adjacent channel signals may have a duration greater than the designed delay period. And, when a modulated signal is the system signal in such devices, the receiver generates the shocking potential after receipt of any frequency audio tone of sufficient duration, including voice signals and heterodynes.

SUMMARY OF THE INVENTION

In the instant invention the foregoing described problems are eliminated. The system is designed to use a radio frequency signal which is modulated to a high percentage by predetermined audio frequency. The collar receiver detects, amplifies and demodulates the signal, and the resulting audio signal is amplified and used to directly actuate a step-up transformer connected to shock electrodes. By eliminating the prior art relay or vibrator, the weight of the collar is reduced and its efficiency and reliability are significantly increased. The demodulated audio signal is amplified by a tuned amplifier, and a trigger circuit connected to the transformer is arranged to accept only audio signals which result from an original modulation percentage above a predetermined level. Means are also provided for attenuating audio signals which differ in frequency from the predetermined audio frequency. Thus, while some spurious or adjacent channel signals may contain some audio components at a high percentage of modulation, and some signals may contain audio at the predetermined audio frequency, few if any spurious signals will contain high levels of modulation at the predetermined frequency, and the system will not be actuated. The system audio frequency can be selected with reference to anticipated adjacent channel uses so as to further minimize accidental system actuation. Usually it is desirable to select audio frequencies below or at the lower range of the human voice spectrum, for example, 200 hz. or below.

DESCRIPTION OF THE PREFERRED EMBODIMENT

Figure 1:
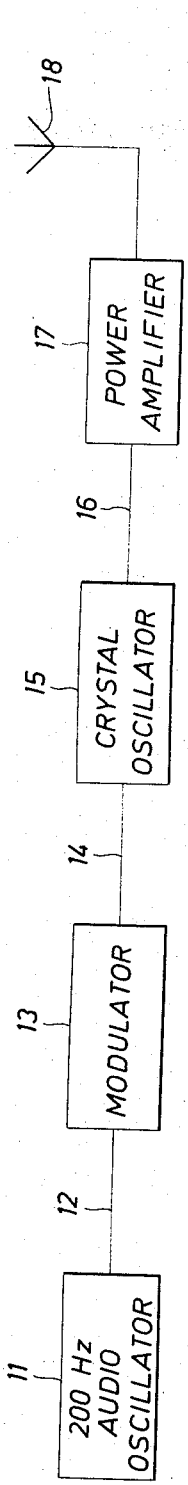
FIG. 1 illustrates in block diagram an audio frequency modulated portable transmitter suitable for use with this invention.

Referring to FIG. 1, the transmitter portion of this system is shown in block diagram and includes an audio oscillator 11 arranged to generate a 200 hz. audio signal. As described above this audio frequency is selected since it is below the normal 300–3,000 hz. human voice spectrum. Therefore, when tuned to this frequency the audio portion of the receiver will be insensitive to adjacent or co-channel interference from voice signals. Of course, other audio frequencies could be selected for the system, as desired.

The output from oscillator 11 on line 12 is amplified by modulator 13 and fed on line 14 to r.f. crystal oscillator 15. The modulated r.f. signal from oscillator 15 is fed on line 16 to power amplifier 17 where it is amplified, after which it is transmitted by antenna 18. No particular form or arrangement of this transmitter is required, and any conventional circuitry may be employed. However, it is necessary that the audio and r.f. frequencies of the transmitter be compatible with those of the receiver, as described below. Also, the transmitter should be capable of being modulated to a modulation percentage sufficient to actuate certain receiver circuits, as described below. Although not shown, it is convenient to make the transmitter operable by a push button and to be constructed with compact and efficient battery powered solid state elements.

Figure 2:
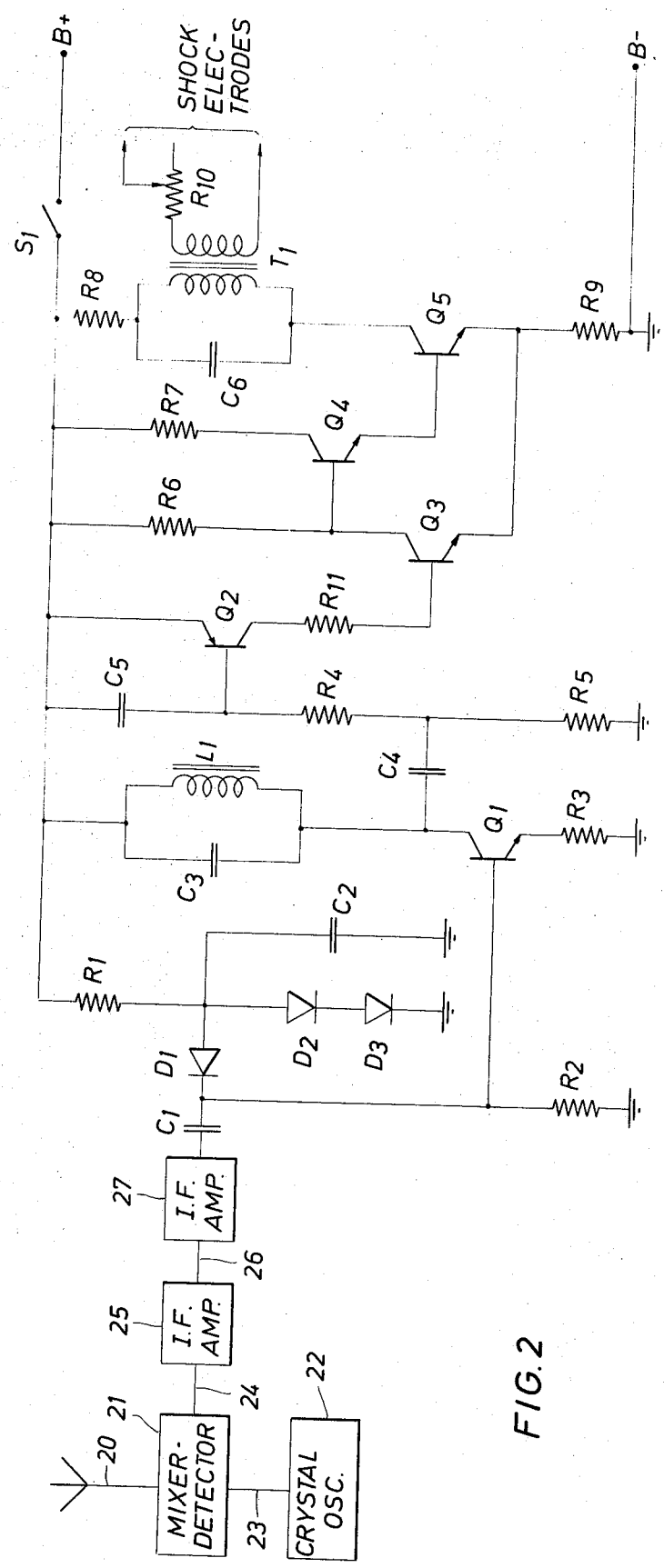
FIG. 2 represents, partially in block diagram and partially in schematic, the receiver portion of the apparatus of this invention.

Referring now to FIG. 2, the receiver portion of this embodiment of the system will be described in detail. The front end or r.f. stages of the receiver are conventional in design and include an antenna 20 leading to a mixer-detector 21. Antenna 20 may be integrally formed with the dog collar (not shown) in any convenient manner. An oscillator 22 supplies a second signal to mixer-detector 21 on line 23, and the resultant modulated r.f. signal is fed on wire 24 to a first I.F. amplifier 25, with the output from amplifier 25 being fed on wire 26 to a second I.F. amplifier 27.

The modulated r.f. signal output from I.F. amplifier 27 is coupled by capacitor C1 to the base of transistor Q1. Transistor Q1 acts both as an audio detector, through diode action at the base, and also acts as an audio amplifier which is tuned to the audio frequency by the C3-L1 parallel resonant circuit in the collector circuit of Q1. A bias for Q1 is derived by supplying the B+ supply to diodes D2 and D3 in series through limiting resistor R1. This bias signal is supplied to the base of Q1 through diodes D1 which is maintained in conduction by the current flow through resistor R2. D1 provides a current path comparable to the base-emitter diode of Q1 so that the current through C1 will be approximately equal on positive and negative portions of the modulated r.f. cycle. The combined voltage drop across D2 and D3 is approximately equal to the combined voltages across D1 and the base-emitter diode of Q1 so that, in the absence of a modulated r.f. signal, Q1 is operating at cut-off very close to conduction. Capacitor C2 is a relatively high valued by-pass capacitor used to eliminate fluctuations in the bias signal, and the current path through D1 prevents the build up of a negative charge on C1.

Although transistor Q1 switches on and off at the r.f. rate, the parallel tuned circuit C3-L1 causes the signal at the collector of Q1 to approximate a sine wave at the audio frequency. Naturally, C3 and L1 are tuned to the transmitter modulation frequency, e.g., 200 hz. Thus, Q1 acts as a tuned audio amplifier and does not amplify audio signals which differ appreciably from 200 hz.

The output of Q1 is coupled by capacitor C4 to a voltage divider composed of R4 and R5. The values of C4 and R4 are appropriately selected to act as a high pass filter, allowing audio frequencies of 200 hz. and above to pass, and attenuating frequencies below 200 hz. The value of C4 should be selected to have a relatively small capacitive reactance at 200 hz, with a resulting increasing reactance below 200 hz. Therefore C4 and R4 provide further means for attenuating audio frequencies below the desired audio frequency.

The audio signal passed through C4 is coupled to the base of transistor Q2 through resistor R4. A second unwanted signal rejection occurs at the base of Q2 through the action of by-pass capacitor C5. C5 acts as a low pass filter that has a high capacitive reactance at 200 hz. and a decreasing reactance at higher frequencies, thereby providing means for attenuating audio signals higher than the desired audio frequency.

Transistor Q2 is a PNP transistor which operates as an audio amplifier and is biased just above cutoff by the negative base current flowing through resistors R4 and R5. If R4 were zero, a very small signal from C4, representative of perhaps a small percentage of modulation in the signal at the base of Q1, would be sufficient to force Q2 to cutoff. However, by properly selecting the values of R4 and R5, any percentage modulation level can be set as the minimum signal necessary to cut Q2 off. Preferably this circuit should be arranged to require a high level of modulation, on the order of 70 percent or greater, thereby preventing accidental actuation of the device by spurious signals.

Transistors Q3, Q4 and Q5 act as a trigger circuit, with Q3 and Q5 functioning as an emitter coupled multivibrator, and Q4 acting as a current multiplier for Q5. R6 and R7 provide the collector load for Q3 and Q4, respectively, while the primary of T1 in parallel with C6 provide a collector load for Q5. R9 is the common emitter resistor for the multivibrator circuit.

Q3 is an NPN transistor having its base coupled to the collector of Q2 through resistor R11, and therefore Q3 will conduct when Q2 conducts and will be cut off when Q2 is cut off. If Q2 and Q3 are conducting, then the base of Q4, and consequently the base of Q5 will be held near the emitter voltage of Q5, so that Q5 will be cut off. As the base of Q3 is made less positive, it will begin to conduct less, allowing the bases of Q4 and Q5 to become more positive with respect to the emitter of Q5. As Q5 begins to conduct, the current flow through R9 will increase, tending to make the emitter of Q3 more positive and further decreasing the base to emitter voltage on Q3. This causes Q3 to cut off further. When Q3 begins to cut off a regenerative action takes place causing rapid switching of Q3 and of Q4 and Q5. If Q3 were initially cut off and an increasing base voltage is applied, a similar regenerative action occurs through R9 and the trigger circuit will switch to its opposite state with Q3 conducting and Q4 and Q5 cut off.

The rapid switching on and off of Q3 and of Q4 and Q5 is controlled by the switching of Q2. Therefore, Q5 will switch at the audio frequency, e.g., 200 Hz., alternately providing a current path thru the primary of T1 and opening this path. Current thru Q5 and its load consisting of the primary of T1 in parallel with C6 is limited by resistor R8. When Q5 is switched on, current builds up in the primary of T1. Due to the inductance of the primary of T1, the signal at the collector of Q5 will approximate a square wave with a positive pulse superimposed thereon at the beginning of each positive half cycle. When Q5 cuts off, a very large voltage pulse occurs on the secondary of T1. Since the desirable voltage at the secondary of T1 is approximately 1,000 volts, C6 is used to prevent higher secondary voltages at T1. Another important function performed by C6 is to limit the primary voltage pulse in T1 to a value below the breakdown voltage of transistor Q5. Q5 must, of course, withstand this high voltage, and the choice of C6 limits the voltage.

The secondary of T1 may be connected directly to shock electrodes or may be connected in series with limiting resistor R10, as shown in FIG. 2. It is preferable to use a variable resistor such as R10 so that different electrode voltages may be selected for different animals and/or for different training conditions.

In operation the collar carrying the FIG. 2 apparatus is placed on the animal and is activated by closing S1. Thereafter, a shock potential is delivered to the animal whenever a signal is received at the proper carrier frequency which has the proper percentage of modulation of the preselected audio frequencies. No shock potential results if an unmodulated signal of proper carrier frequency is received or if a signal with proper audio and carrier frequencies but at a low percentage of modulation is received.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. However, various changes may be made in these embodiments and equivalent elements or circuits may be substituted for those illustrated and described herein, parts may be reversed, and certain features of the invention may be utilized independently of the use of other features, all as would be apparent to one skilled in the art after having the benefit of this description of the invention.

What is claimed is:

1. In electronic animal training apparatus for use with a radio frequency transmitter modulated at a predetermined audio frequency, the combination comprising:
   means for detecting and amplifying said audio frequency modulated radio frequency signal;
   means connected to said detecting and amplifying means for demodulating said signal to produce an audio signal at said audio frequency;
   means for selectively amplifying said audio signal, said selective amplifying means including means for inhibiting amplification of said audio signal when the percentage of audio modulation of said radio frequency signal is below 70 percent; and,
   means for communicating said selectively amplified signal to an animal to be trained, said communicating means including:
   shock electrodes arranged for contact with said animal; and
   means for coupling said selectively amplified audio signal to said shock electrodes.

2. The invention as claimed in claim 1, wherein said selective amplifying means includes:
   a first filter operably connected to said audio amplifier and arranged to attenuate signals above said audio frequency; and,
   a second filter operably connected to said audio amplifier and arranged to attenuate signals below said audio frequency.

3. The invention as claim in claim 1 wherein said communicating means includes:
   a transformer operable at said audio signal frequency;
   the secondary of said transformer being connected to said shock electrodes;
   and, means for connecting said selectively amplified audio signal to the primary of said transformer.

4. The invention as claimed in claim 3 wherein said connecting means includes:
   a trigger circuit arranged to switch the current in the primary of said transformer upon receipt of said selectively amplified audio signal.

5. In electronic animal training apparatus for use with a radio frequency transmitter modulated at a predetermined audio frequency, the combination comprising:
   means for detecting and amplifying said audio frequency modulated radio frequency signal;
   means connected to said radio frequency signal detecting and amplifying means for detecting and amplifying said audio frequency signal;
   said audio detector-amplifier being tuned to said audio frequency;
   said audio detector-amplifier also including means for inhibiting amplification of said audio signal when the percentage of audio modulation of said radio frequency signal is below 70 percent;
   a trigger circuit arranged to produce current pulses upon receipt of said audio signal; and,
   means for communicating said current pulses to an animal to be trained.

6. In electronic animal training systems, the combination comprising:
   means for transmitting a radio frequency signal modulated by a preselected audio frequency;
   means for detecting and amplifying said modulated signal;
   means for demodulating said modulated signal to produce an audio signal;
   said demodulating means being tuned to said audio frequency;
   a trigger circuit arranged to provide current pulses upon receipt of said audio signal;
   means for inhibiting passage of said audio signal from said demodulating means to said trigger circuit when the audio modulation percentage of said modulated radio frequency signal is below 70 percent; and,
   shock electrodes arranged to receive said current pulses from said trigger circuit.

* * * * *